United States Patent
Bucher

(10) Patent No.: US 8,322,244 B2
(45) Date of Patent: Dec. 4, 2012

(54) GEAR MECHANISM APPARATUS

(75) Inventor: Johannes Bucher, Weesen (CH)

(73) Assignee: Siemens Schweiz AG, Zurich (CH)

( * ) Notice: Subject to any disclaimer, the term of this patent is extended or adjusted under 35 U.S.C. 154(b) by 1224 days.

(21) Appl. No.: 11/389,292

(22) Filed: Mar. 24, 2006

(65) Prior Publication Data
US 2006/0219038 A1     Oct. 5, 2006

(30) Foreign Application Priority Data
Mar. 31, 2005 (EP) ..................... 05007038

(51) Int. Cl.
*F16H 1/24* (2006.01)
*F16H 55/02* (2006.01)
(52) U.S. Cl. ............. 74/424.71; 74/89.38; 74/89.39
(58) Field of Classification Search .......... 74/89.23, 74/89.38, 89.39, 424.71; 384/226, 228, 590, 384/603; 192/41 S
See application file for complete search history.

(56) References Cited

U.S. PATENT DOCUMENTS

| | | | |
|---|---|---|---|
| 2,623,403 A * | 12/1952 | Terdina | 74/89.39 |
| 4,623,051 A | 11/1986 | Lochmoeller et al. | |
| 6,927,513 B2 * | 8/2005 | Schreier | 310/75 D |

FOREIGN PATENT DOCUMENTS

| | | |
|---|---|---|
| DE | 195 25 454 A1 | 1/1997 |
| DE | 103 06 875 A1 | 7/2004 |
| DE | 103 54 338 A1 | 6/2005 |
| EP | 1 515 415 A | 3/2005 |

OTHER PUBLICATIONS

Machine translation of Mueller DE10354338.*

* cited by examiner

*Primary Examiner* — Troy Chambers
*Assistant Examiner* — Gregory Prather
(74) *Attorney, Agent, or Firm* — Maginot, Moore & Beck

(57) ABSTRACT

A gear mechanism arrangement includes an axial bearing apparatus and a shaft mounted rotatably in the axial bearing apparatus. The shaft is fixedly coupled to a first mechanical coupling point and a second mechanical coupling point, the first mechanical coupling point configured to engage a gear stage and the second mechanical configured to engage a movement converter. The movement converter is configured to convert between a rotational movement and a longitudinal movement of the gear mechanism arrangement. The axial bearing apparatus is configured to transmit a force which acts axially on the shaft to a stationary part of the gear mechanism apparatus arrangement. The axial bearing apparatus is further configured such that active bearing friction is dependent on a rotational direction of the rotational movement and differs for each of first and second rotational directions of the rotational movement.

5 Claims, 2 Drawing Sheets

GEAR MECHANISM APPARATUS

Figure 1:
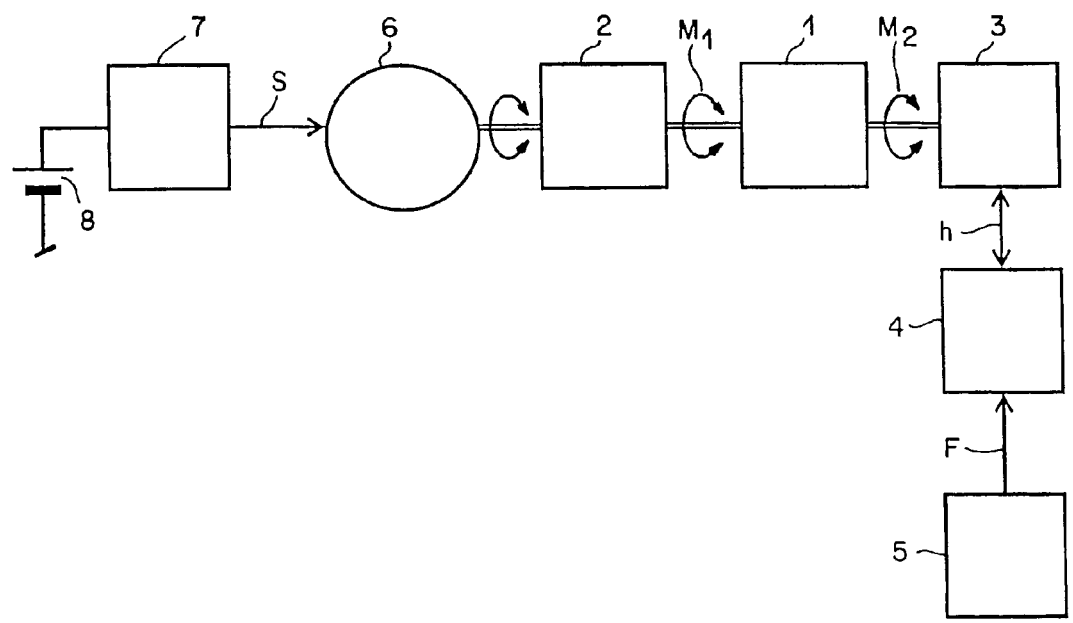

The invention relates to a gear mechanism apparatus for a drive which has a movement converter.

Gear mechanism apparatuses of this type can be used in general in drives, in which a rotational movement is converted reversibly into a longitudinal movement.

A gear mechanism apparatus of this type can be used as a reversing brake, for example, in an actuating drive, in which a rotational movement is converted reversibly into a longitudinal movement.

Gear mechanism apparatuses of this type can also be used, in particular, in valve drives, slide drives or flap drives, in which an actuator is to be actuated by a longitudinal movement and the actuating energy is supplied, for example, by an electric motor. Gear mechanism apparatuses of this type can thus also be used, by way of example, in controllable drives for actuators in heating, ventilation, air conditioning and refrigeration technology.

It is known to use, for example, lead screws or threaded spindles in combination with a nut element as a movement converter for converting a rotational movement into a longitudinal movement, either a threaded bolt or a suitable nut element performing the rotational movement.

In principle, a high degree of efficiency is required, in particular, if a drive is supplied electrically by means of battery. Thus, for example, a high degree of efficiency is also aimed for if a stroke of a valve is to be displaced counter to the valve force. If, however, a gear mechanism apparatus then has a high degree of efficiency, the disadvantage results that the limit of the selflocking action is undershot. In this case, for example, a valve timing mechanism would reset itself automatically if the supply of a drive motor were interrupted. The use of a selflocking movement converter, for example, could provide a remedy.

However, reversible movement converters are now known which have a high degree of efficiency in both directions, that is to say are not selflocking, and which are particularly advantageous for battery fed drive apparatuses, on account of the low energy loss.

The invention is based on the object of providing a gear mechanism apparatus for a drive having a movement converter which has no selflocking action, in such a way that said drive has a high degree of efficiency in at least one drive direction.

According to the invention, the abovementioned object is achieved by the features of claim 1. Advantageous refinements result from the dependent claims.

Figure 2:
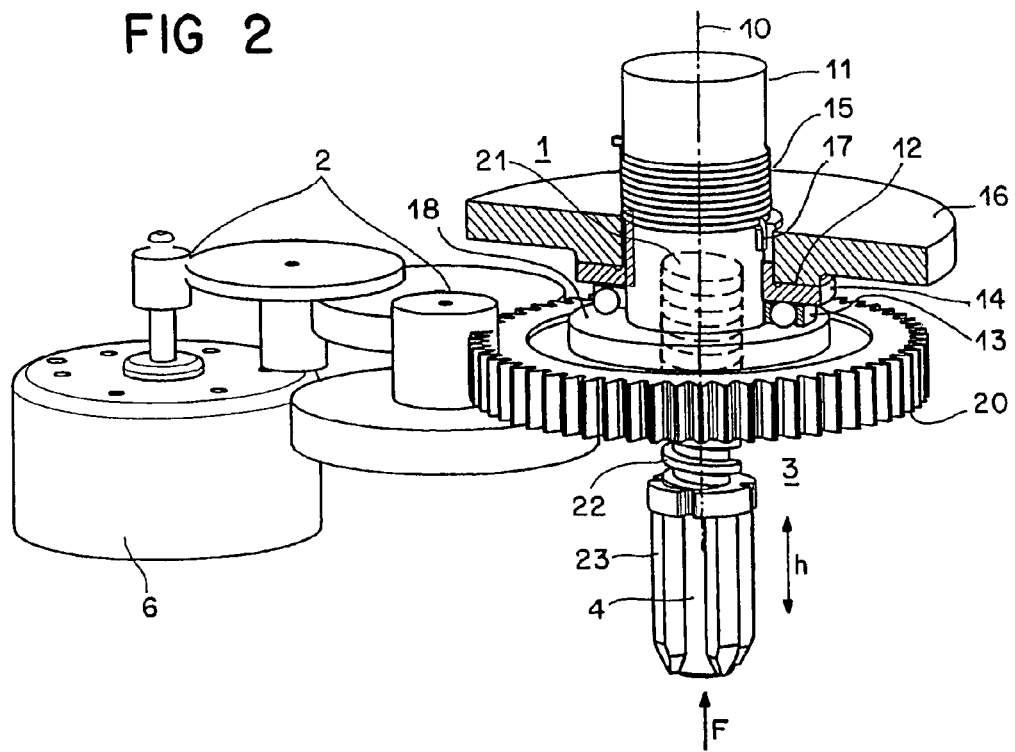
Figure 3:
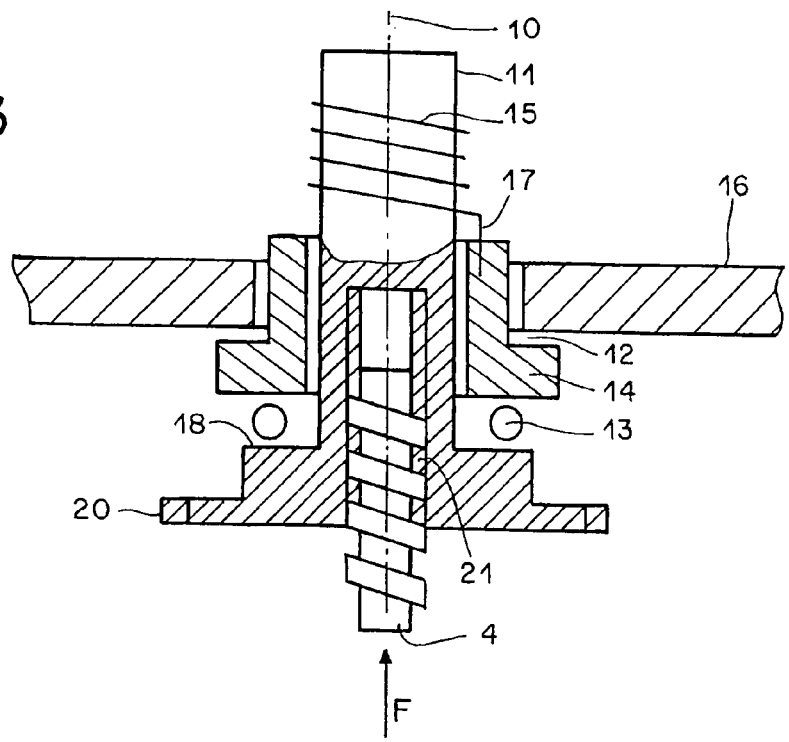
Figure 4:
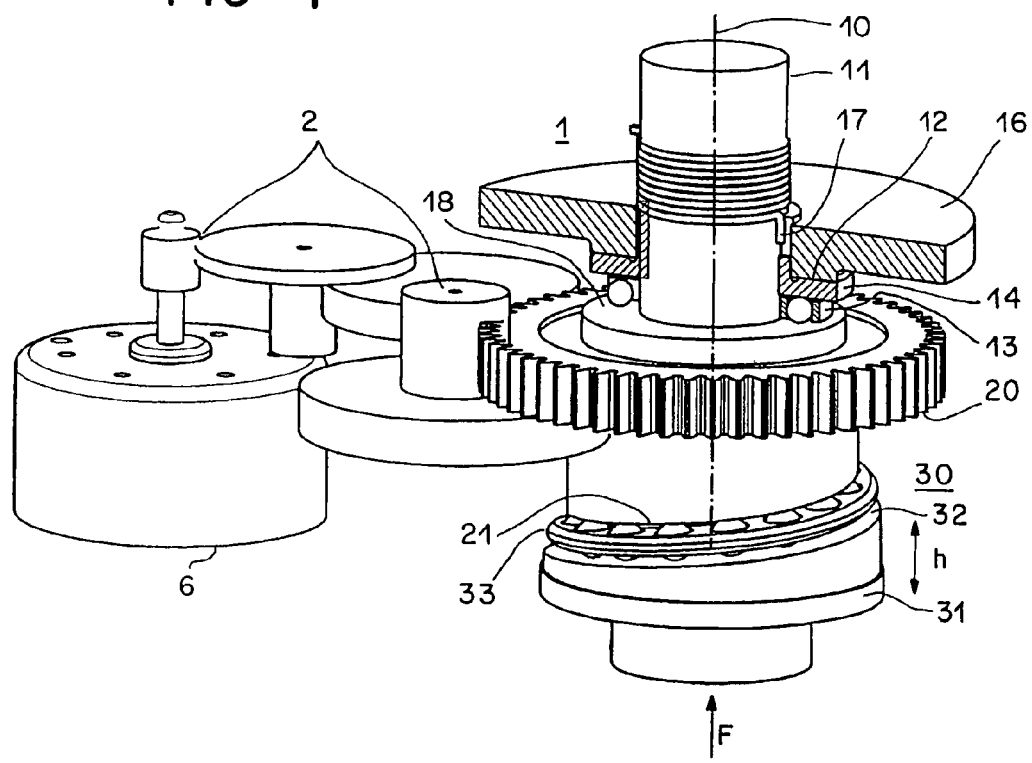

In the following text, exemplary embodiments of the invention will be explained in greater detail using the drawing, in which:

FIG. 1 shows a diagrammatic illustration of an exemplary actuating apparatus having a gear mechanism apparatus according to the invention, FIG. 2 shows a detail of the actuating apparatus having the gear mechanism apparatus according to the invention, FIG. 3 shows a basic view with the gear mechanism apparatus, and FIG. 4 shows a detail of the actuating apparatus having the gear mechanism apparatus according to the invention and one variant of a movement converter.

In FIG. 1, an exemplary actuating apparatus comprises a gear mechanism apparatus 1, a gear stage 2, a movement converter 3, an actuating element 4, an actuator 5, an electric motor 6, an electronic control unit 7 and a supply means 8.

The gear mechanism apparatus 1 is coupled mechanically between the gear stage 2 and the movement converter 3. A rotational movement of the gear mechanism apparatus 1 can be converted into a longitudinal movement h of the actuating element 4 and, conversely, also a longitudinal movement h of the actuating element 4 can be converted into a rotational movement of the gear mechanism apparatus 1 by the movement converter 3.

The actuator 5 is, for example, a valve or a flap and the actuating element 4 is a tappet or a lever for actuating the valve or the flap.

The gear stage 2 can be driven by the electric motor 6. The electric motor 6 is controlled by a control signal S via the control unit 7 which is connected to the supply means 8. In one design variant, the actuating apparatus is part of a control circuit in heating, ventilation, air conditioning or refrigeration technology.

A first torque M1 which is produced by the electric motor 6 via the gear stage 2 is transmitted as a second torque M2 to the movement converter 3 via the gear mechanism apparatus 1, preferably with as high a degree of efficiency as possible, in the ideal case practically without loss. The movement converter 3 transforms the second torque M2 into the longitudinal movement h counter to a force F of the actuator 5 with as high a degree of efficiency as possible, preferably at least with a degree of efficiency>50%.

According to the invention, the gear mechanism apparatus 1 is designed in such a way that, in a rest state of the electric motor 5, that force F of the actuator 5 which acts in the other direction on the movement converter 3 via the actuating element 4 is reliably incapable of rotating the electric motor 6 backward.

The gear mechanism apparatus 1 is thus provided such that, in a first rotational direction, the first torque M1 which is to be produced by the electric motor 6 is transformed as far as possible without loss into the second torque M2 which is transmitted to the movement converter 3. However, the gear mechanism apparatus 1 is also constructed in such a way that, in the second rotational direction which is the opposite direction to the first rotational direction, the second torque M2 which is caused by the actuator 5 via the movement converter 3 is output to the gear stage 2 with a predefined loss. The second torque M2 which acts as a drive moment in this case is thus converted by the gear mechanism apparatus 1 into the first torque M1 which acts as a drive moment with a degree of efficiency which is so low that the stationary electric motor 6 is not rotated backward.

In FIG. 2, functional units of the actuating apparatus are shown in detail, namely the electric motor 6, the gear stage 2 which is shown only as an outline and the gear mechanism apparatus 1 which is coupled mechanically to the gear stage 2 and the movement converter 3.

The advantageous design variant of the gear mechanism apparatus 1 comprises a shaft 11 which can rotate about a rotational axis 10, an axial bearing apparatus which has a first axial bearing 12 and a second axial bearing 13, a bearing bush 14 which is arranged coaxially with respect to the shaft 11, a wrap spring 15 which is wound around the shaft 11, and a stationary gear mechanism part 16. One end 17 of the wrap spring 15 is advantageously fastened to the bearing bush 14 with a form-fitting connection.

The wrap spring 15 functions as a wrap spring coupling which is active between the shaft 11 and the bearing bush 14 and is dependent on the rotational direction of the shaft 11.

According to the invention, the gear mechanism apparatus 1 is constructed in such a way that, depending on the rotational direction of the shaft 11, the shaft 11 is mounted rotatably either via the first axial bearing 12 or then via the second axial bearing 13 and axially on the stationary gear mechanism part 16.

The bearing bush 14 is advantageously configured and arranged in such a way that the shaft 11 is mounted radially on the stationary gear mechanism part 16 by the bearing bush 14.

The first axial bearing 12 is advantageously arranged between the stationary gear mechanism part 16 and the bearing bush 14 and is configured by way of example as a sliding bearing which acts axially between the stationary gear mechanism part 16 and the bearing bush 14.

The second axial bearing 13 is advantageously arranged between a step 18 which is formed on the shaft 11 and the bearing bush 14, and is advantageously configured as a roller bearing, for example as a ball bearing.

The stationary gear mechanism part 16 is, for example, a housing part of the actuating apparatus or a holding device or a housing part of the gear mechanism apparatus 1.

The gear mechanism apparatus 1 has mechanical coupling points for incorporation into a surrounding system. A first mechanical coupling point 20 which is intended for coupling of the gear mechanism apparatus 1 to the gear stage 2 is advantageously a gearwheel which is formed directly on the shaft 11 or is connected rigidly to the shaft 11.

A second mechanical coupling point 21 which is intended for coupling the gear mechanism apparatus 1 to the movement converter 3 is, by way of example, an internal thread which is formed directly on the shaft 11.

The movement element 4 has an external thread 22 which matches the internal thread which serves as a second mechanical coupling point 21. At least one web 23 or one groove is advantageously formed directly on the movement element 4, with the result that the movement element 4 can be secured against rotation in order to perform the longitudinal movement h with a matching mating piece (not shown here).

Essential functional elements of the movement converter 3 are advantageously realized by suitable refinements of the second mechanical coupling point 21 and of the actuating element 4.

In principle, the two mechanical coupling points 20 and 21 can be adapted within wide limits to a surrounding system. In order to realize the second mechanical coupling point 21, in particular, a plurality of obvious variants result which are a consequence of the choice of the movement converter 3 which is provided. In a further variant (not shown), the second mechanical coupling point 21 is realized by cams or slides which are arranged on the shaft 11 and engage into a helix which is arranged on the movement element 4 or into a spiral groove which is cut into the movement element 4.

The gear mechanism apparatus 1 which has a degree of efficiency which depends on the rotational direction is outlined in principle in FIG. 3, in order to clarify its method of operation. The wrap spring 15 is arranged on the shaft 11 and wound in such a way that, during a rotational movement of the shaft 11 in the counterclockwise direction (as viewed in the arrow direction of the illustrated force F), the bearing bush 14 is released and thus decoupled from the shaft 11. In this case, the shaft 11 is mounted in an axially rotatable manner by way of the second axial bearing 13 which has a high degree of efficiency.

During a rotational movement of the shaft 11 in the clockwise direction (as viewed in the arrow direction of the illustrated force F), the bearing bush 14 is fixed on the shaft 11 by the wrap spring 15, with the result that the bearing bush 14 rotates with the shaft 11 in the clockwise direction, as a result of which the first axial bearing 12 is switched into the active state. In this case, the shaft 11 is mounted axially rotatably by way of the first axial bearing 12 which has a lower degree of efficiency than the second axial bearing 13. During the rotational movement in the clockwise direction, the second axial bearing 13 which has the high degree of efficiency is thus switched into the inactive state as a movement bearing, as it is arranged between the step 18 which rotates with the shaft 11 and the bearing bush 14 which likewise rotates with the shaft 11.

In FIG. 4, the second mechanical coupling point 21 of the gear mechanism apparatus 1 is realized by a helical step which can rotate with the shaft 11 about the rotational axis 10. The helical step has a convolution and is formed, by way of example, on the shaft 10. The helical step is part of one advantageous design variant 30 of the movement converter 3 (FIG. 1). One design variant 31 of the actuating element 4 (FIG. 1) has a further helical step 32 with a convolution. The design variant 31 of the actuating element 4 is arranged coaxially with respect to the rotational axis 10 of the shaft 11, but is secured against rotation. A bearing element 33 is arranged between the helical second mechanical coupling point 21 and the further helical step 32. The force F which acts on the design variant 31 of the actuating element can be transmitted to the shaft 11 via the bearing element 33. The bearing element 33 is advantageously configured as a roller bearing, for example as a ball bearing. In one inexpensive variant, the bearing element 33 is a plastic tape in the shape of a perforated disk, in which steel balls are held and which has radial slots, with the result that the plastic tape can be embedded between the two helical steps 21 and 32. In the design variant 30 (shown in FIG. 4) of the movement converter, a rotational movement of the shaft 11 which can be converted into a longitudinal movement h is smaller than a complete revolution, as a minimum mutual overlap of the two helical steps 21 and 32 always has to be ensured.

It goes without saying that a large number of requirements of a drive, such as the actuating force which is to be produced, the direction of action and reciprocal movement, can be attained with the gear mechanism apparatus 1 according to the invention, as a result of the suitable selection and matching of the rotational direction of the electric motor 6, the gear reduction of the gear stage 2, the winding direction of the wrap spring 15, if appropriate the pitch and the winding direction of a helix on the movement converter 3 and the bearing friction of the two axial bearings 12 and 13. The fact that the drive, moreover, can be used in an optimum energy saving manner affords the advantage that the energy can be supplied 8 (FIG. 1) by means of a battery or from a data bus. Long service lives without a battery change in the case of wirelessly controlled drives are made possible by the fact that the gear mechanism apparatus 1 permits the use of drives, for example valve drives, with a minimum energy consumption.

The invention claimed is:

1. A gear mechanism arrangement comprising:
   an axial bearing apparatus;
   a shaft mounted rotatably in the axial bearing apparatus, the shaft fixedly coupled to a first mechanical coupling point and a second mechanical coupling point, the first mechanical coupling point configured to engage a gear stage and the second mechanical coupling point configured to engage a movement converter, the movement converter configured to convert between a rotational movement and a longitudinal movement of the gear mechanism arrangement, wherein the axial bearing apparatus is configured to transmit a force which acts axially on the shaft to a stationary part of the gear mechanism arrangement, a bearing bush arranged coaxially with respect to a longitudinal axis of the shaft and disposed between the shaft and the stationary part of the gear mechanism arrangement, a wrap spring wound on the shaft and having a first end fastened to the bearing bush, wherein the axial bearing apparatus has a first axial bearing and a second axial bearing, the first axial bearing being arranged between the stationary part of the gear mechanism arrangement and the bearing bush and the second axial bearing being arranged between the shaft and the bearing bush, wherein the wrap spring is wound on the shaft such that the wrap spring fixes the bearing bush to the shaft during rotational movement of the shaft in a first rotational direction and releases the bearing bush from the shaft during rotational movement of the shaft in a second rotational direction that is opposite the first rotational direction, wherein the first axial bearing is active and the second axial bearing is inactive during rotational movement of the shaft in the first rotational direction to allow the bearing bush to rotate with respect to the stationary part of the gear mechanism arrangement along with the shaft, wherein the second axial bearing has a higher degree of efficiency than the first axial bearing such that the second axial bearing is active and the first axial bearing is inactive during rotational movement of the shaft in the second rotational direction to allow the shaft to rotate with respect to the bearing bush, and wherein the wrap spring is arranged such that neither of the two axial bearings are covered by the wrap spring.

2. The gear mechanism arrangement as claimed in claim 1, wherein the axial bearing apparatus is further configured such that, during a longitudinal movement counter to an actuating force of an actuating element coupled to the movement converter, the bearing friction is lower than during a longitudinal movement of the actuating element which is supported by the actuating force.

3. The gear mechanism arrangement as claimed in claim 1, wherein in the stationary gear mechanism part comprises a housing part.

4. The gear mechanism arrangement as claimed in claim 1, wherein the first axial bearing comprises a sliding bearing and the second axial bearing comprises a ball bearing.

5. The gear mechanism apparatus as claimed in claim 1, wherein the first mechanical coupling point comprises a gearwheel and the second mechanical coupling point comprises a thread operably coupled to the movement converter and which is formed on the shaft.

* * * * *